United States Patent [19]

Kuwahara

[11] Patent Number: 4,843,906
[45] Date of Patent: Jul. 4, 1989

[54] REAR AXLECASE AND METHODS OF MANUFACTURING THEREOF

[75] Inventor: Toru Kuwahara, Kawasaki, Japan

[73] Assignee: Isuzu Motors Limited, Tokyo, Japan

[21] Appl. No.: 136,318

[22] Filed: Dec. 22, 1987

[30] Foreign Application Priority Data

Dec. 24, 1986 [JP] Japan .................. 61-306326

[51] Int. Cl.$^4$ ............................................. F16H 57/02
[52] U.S. Cl. .................................. 74/607; 74/606 R; 148/3
[58] Field of Search ................. 74/607, 606 R; 148/3; 228/169, 170, 166; 29/463

[56] References Cited

U.S. PATENT DOCUMENTS

| 2,569,452 | 10/1951 | Buckendale | 74/607 |
| 2,674,783 | 4/1954 | Schneider et al. | 74/607 X |
| 3,269,214 | 8/1966 | Nagel | 74/607 |
| 3,535,002 | 10/1970 | Stamm | 74/607 X |
| 3,673,888 | 7/1972 | Moll et al. | 74/607 |
| 3,715,935 | 2/1973 | Ebey | 74/607 |
| 3,793,703 | 2/1974 | Winkler et al. | 74/607 X |
| 4,234,120 | 11/1980 | Pringle | 74/607 X |
| 4,760,755 | 8/1988 | Peck | 74/606 R |

FOREIGN PATENT DOCUMENTS

| 675762 | 12/1063 | Canada | 74/607 |
| 2154186 | 9/1985 | United Kingdom | 74/607 |
| 2155867 | 10/1985 | United Kingdom | 74/607 |

Primary Examiner—Vinh Luong
Attorney, Agent, or Firm—Dykema Gossett

[57] ABSTRACT

A rear axlecase is manufactured by casting the differential gear housings and the axle housings into an integral body from nodular graphite cast iron, and ensuring good ductility therefor by reducing the hardness as a whole on one hand, and ensuring toughness to bear up under the stress acting on the axles by performing hardening treatment on the root parts of the endtubes of the axle housing.

6 Claims, 7 Drawing Sheets

REAR AXLECASE AND METHODS OF MANUFACTURING THEREOF

BACKGROUND OF THE INVENTION

1. Technical Field

The present invention relates to the rear axlecase of a vehicle, and particularly to those rear axlecases which are made of a nodular graphite cast iron casting, in which the endtubes of the axle housing are improved in terms of material quality.

2. Background Art

Figure 7:
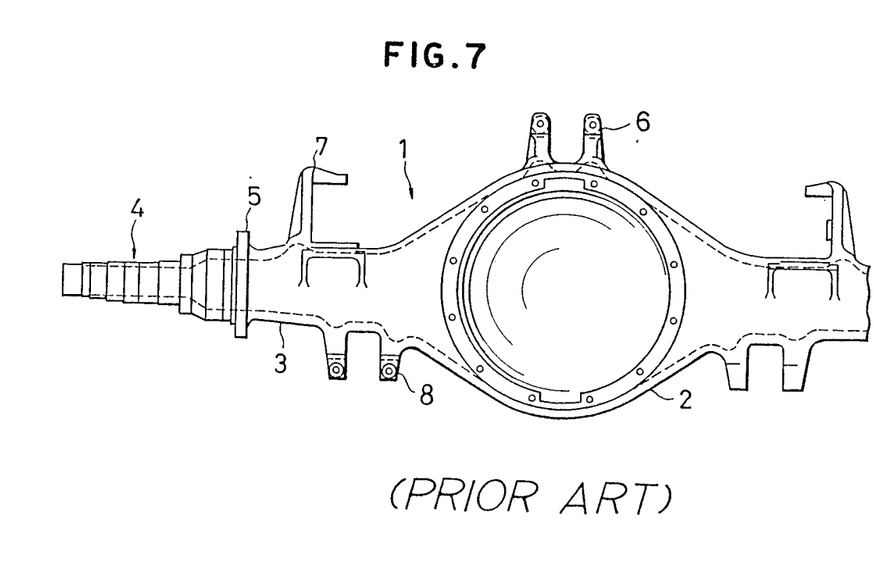
FIG. 7 is a side view of the major part of a conventional rear axlecase, showing the first example therefor.

The conventional construction of the automobile rear axlecase that houses a differential gear and the two axles that extend laterally from the differential gear can be described as follows:

As shown in FIG. 7 of the accompanying drawings, which presents an example of conventional design, the rear axlecase 1 is made up mainly of a differential gear housing 2 and two axle housings 3, which extend laterally in opposite directions from the differential gear housing 2. At either end of the axle housings 3, there is formed an endtube 4, and at the differential gear housing 2 side thereof, there is formed a brake flange 5. In the top part of the differential gear housing 2, there is formed one or more pieces of a bracket 6. At the top part of each axle housing 3, there is formed a spring seat 7, while at a bottom part thereof, there is formed one or more pieces of torquerod bracket 8. Here, the endtubes 4 are made of a casting of good mechanical properties, while most of the other parts are press formed, and these members are assembled as by welding into a complete rear axlecase 1.

In this example, because plural members are assembled by welding, not only is productivity low, but the weldments are liable to become weak in structural integrity. One further problem here is that, should a weldment be found deficient in strength, the only remedial measure possible would be redesigning to enlarge the fundamental dimensions, thereby necessitating alteration of the form of the parts. Another problem is that, since press dies are expensive to make, this method is not suitable to flexible manufacturing.

In another example, attempts at overcoming these difficulties were made by resorting to a construction, in which the above mentioned plural members were all cast into one integral body from a cast steel, or alternatively, the differential gear housing 2 and the axle housing 3 were cast into one integral body from cast steel, and brackets 6 and the like were attached thereto by means of bolts or welding, so as to be assembled into a complete rear axlecase 1.

The problem with this latter approach was that the castability of cast steels is poor due to the need for high temperatures and the formation of shrinkage cavities; the requirements imposed on the casting mold are severe thereby raising production costs, and manufacture of thin wall articles is difficult, making weight reduction difficult.

Figure 8:
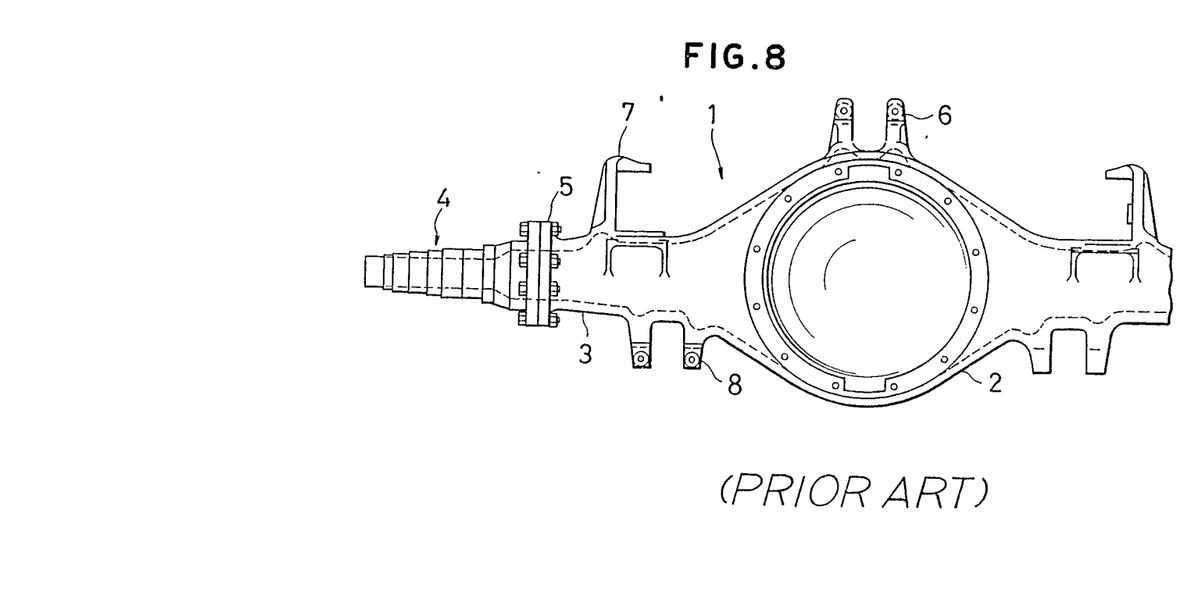
FIG. 8 is a side view of the major part of a conventional rear axlecase, showing the third example therefor.

To solve these problems, yet another construction has been devised. In this third conventional practice, an example of which is shown in FIG. 8, the endtubes 4 of the axle housing 3, which require a high degree of toughness, are made from a foreging, which is known to have good mechanical properties, while the parts of the axle housing 3 other than the endtubes 4, whose deficiency in strength may be corrected by adjusting the form and dimensions, are cast into an integral body together with the differential gear housing 2 from nodular graphite cast iron, and forgings and nodular graphite cast iron castings are assembled with bolts.

The problem here is that, since welding of forgings to nodular graphite cast iron casting is difficult, if not entirely impossible using technology available today, and since, even if successfully welded, the strength of weldment is insufficient, the forging part and casting part have to be joined by means of bolt, thereby necessarily raising the production cost.

SUMMARY OF THE INVENTION

The present invention is aimed at solving the problems mentioned above.

Namely, it is an object of this invention to provide a rear axlecase that is low in hardness and is ductile as a whole so that it will not fracture, even if deformed when it hits an object protruding from the road surface.

Another objective of this invention is to provide a rear axlecase having a hardness in its endtube parts that is sufficiently greater than that of the other parts so as to make them strong and tough, in order that the endtubes will not be damaged by stress working on the axle.

Yet another objective of this invention is to provide a rear axlecase that can be manufactured at a low cost by casting the differential gear housings and the axle housing into an integral body, thus dispensing with assembly work such as welding or joining by bolts.

DESCRIPTION OF THE PREFERRED EMBODIMENTS

The preferred embodiments of the rear axlecase of this invention will now be disclosed in detail, with reference to attached drawings.

Figure 1:
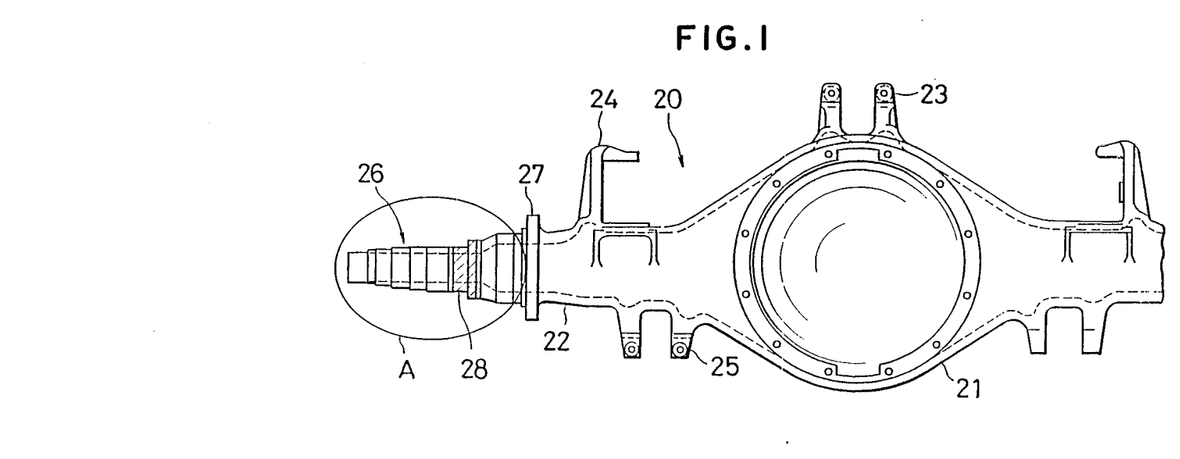
FIG. 1 is a side view of the major part of the rear axlecase of this invention, illustrating a preferred embodiment of this invention.

As shown in FIG. 1, the rear axlecase 20 consists mainly of a differential gear housing 21 of approximately spherical shape that houses the differential gear, the two axle housings 22 of cylindrical shape that extend laterally in opposite directions from the differential gear housing 21 to house two axles which also extend laterally from the differential gear. The differential gear housing 21 and the axle housings 22 are cast into an integral body from nodular graphite cast iron.

In the top part of each differential gear housing 21, there is provided one or more pieces of bracket 23, while in each axle housing 22, there is provided in its top part a spring seat 24 and in its bottom part there is one or more pieces of a torquerod bracket 25. Although the bracket 23, spring seat 24, and torquerod bracket 25 are integrally cast into one body together with the differential gear housing 21 and the axle housings 22 from nodular graphite cast iron in the present embodiment, they may be separate members which are attached by bolts.

At each end of the axle housing 22, there is formed an endtube 26, and at the differetial gear housing 21 side thereof, there is formed a brake flange 27. In each of the endtubes 26, there is also formed a hardened structure part 28. In the present embodiment, the hardened structure 28 is formed by accelerating the cooling rate of the endtube 26 as a whole (the part designated by A in FIG. 1), either by exposing part A to atmospheric air earlier than other parts and letting it naturally air cool, or forcible cooling part A.

Furthermore, the differential gear housings 21 and the parts of the axle housings 22 other than the endtubes 26 in the integral body are made into the ductile structure. This is achieved by letting the differential gear housing 21 and the parts of the axle housings 22 other than the endtubes 26 cool while in the casting mold.

In the present embodiment, furthermore, the root part of the endtube 26 which corresponds to above mentioned hardened structure part 28 may be subjected to high frequency quenching, on the one hand, and the rear axlecase 20 as a while be subjected to annealing, on the other hand. If the quenching is to be conducted before annealing, quenching is performed from a temperature in or near the range of 970–980 degrees C., and annealing is performed at a temperature below the $A_1$ transformation point (about 720 degrees C.). Such a heat treatment finishes the structure of the root part of the endtube 26 (shown in FIG. 1 by hatching lines) in the tempered martensitic structure, while leaving other parts in more ductile pearlite structure.

If the quenching is to be conducted after annealing, on the other hand, annealing is performed at a temperature near 800 degrees C., while quenching is performed at a temperature in or near the range of 970–980 degrees C. Such a heat treatment finishes the structure of the root part of the endtube 26 (shown in FIG. 1 by hatching lines) in the martensitic structure, while leaving other parts in more ductile pearlite structure.

The particulars of quenching and annealing are to be decided upon in accordance with the incidental needs, such as the kind of the nodular graphite cast iron to be used and the design strengths to be attained, but the ultimate construction goal in the present embodiment is that, after the rear axlecase 20 has been cast as an integral body, only the root parts of the two endtubes 26 of aforesaid axle housing 22 should be subjected to hardening treatment to form the hardened parts 28, while the entire remaining part of the casting should be ductile.

The rear axlecases 20 of this invention, having a construction as described above, are manufactured by a method which will now be described.

Figure 2:
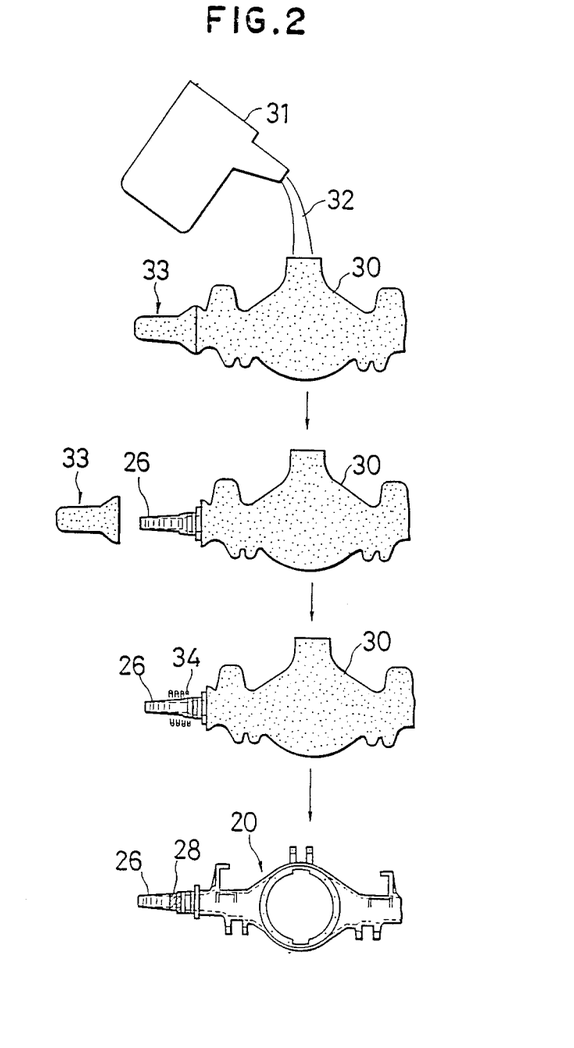
FIG. 2 is a set of schematic drawings, illustrating a method of manufacturing the rear axlecase of this invention.

As illustrated in FIG. 2, a sand casting mold 30 is prepared so as to produce the differential gear housing 21 and the axle housings 22 in an integral casting. In the present embodiment, brackets 23 and the like are also integrated into the same mold. After completing the casting of the molten nodular graphite cast iron 32 in a ladle 31, first the part 33 of the mold 30 which has served to make the whole of the endtube 26 (the hatched part A in FIG. 1) is divided and removed, leaving the endtube 26 to cool natrually or be cooled forcibly so as to refine the granular structure to raise its strength the toughness, but the rest of the casting, comprising the parts of the axle housing 22 other than the endtubes 26, the differential gear housing 21, and the brackets 23 and the like, is left in the mold 30, cooling as is so as to develop ductility.

Subsequently, the root part of each of the endtubes 26 of each axle hosing 22 is subjected to high frequency quenching from a temperature in or near the range of 970–980 degrees C. by means of a high frequency quenching machine 34 into a hard martensitic structure. Thereafter, the rest of the casting is taken out of the mold 30, and the whole body is annealed at a temperature below the $A_1$ transformation point.

As a result of this process, the root parts of the endtubes 26 are finished in a hard and tough tempered martensitic structure, while the rest are finished in a ductile pearlite structure.

In the method described above, the order of the two heat treatments may be reversed, performing the whole body annealing first, then the high frequency quenching, where the annealing is conducted at a temperature near 800 degrees C., and the high frequency quenching is conducted at a temperature in or near the range of 970–980 degrees C. As a result of this process, the root parts of the endtubes 26 are left in hard martensitic structure, while the rest is in ductile pearlite structure.

In either case, an endtube 26 that will not be damaged by the stress acting on the axle, which concentrates at the root part thereof, is formed. Since the parts other than the endtubes 26 of the integrally cast rear axlecase 20 are in a pearlite structure of a low hardness of $H_B = 150$ or thereabout, good mechanical properties having an improved elongation value are realized, so that they will not fracture, even if deformed, on contact with an object protruding from the road surface.

The particulars of the high frequency quenching and annealing treatments should be decided upon in accordance with the kind of the nodular graphite cast iron to be used, the design strength to be attained, and other pertinent considerations.

Furthermore, since the use of nodular graphite cast iron in making the differential gear housings 21 and the axle housings 22 into an integral body ensures good castability, not only the wall thicknesses, hence the weight, of the rear axlecase 20 can be reduced substantially as a whole, but such assemblage functions without welding or bolts, making it possible to manufacture the rear axlecase 20 at a low cost.

The foregoing has been verified by actually manufacturing a number of rear axlecases 20 according to this invention. A nodular graphite cast iron of a chemical composition shown in Table 1, which is equivalent to ASTM A536-84, was used.

TABLE 1

| Chemical Composition (percentage by weight) | | | | | | |
|---|---|---|---|---|---|---|
| C | Si | Mn | S | Cr | Cu | Mg |
| 3.42 | 2.50 | 0.28 | 0.005 | 0.033 | 0.21 | 0.04 |

Figure 3:
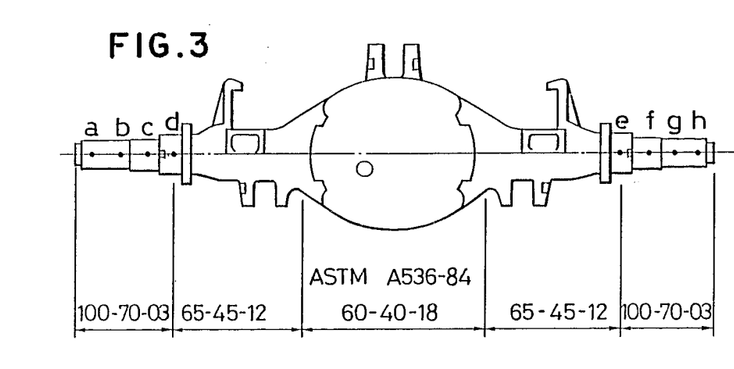
FIG. 3 is a drawing, presenting an example set of design specifications of the rear axlecase of this invention.

The design specifications were as given in FIG. 3, according to which the differential gear housing 21 should be 60-40-18 in ASTM A536-84, the parts of the axle housing 22 other than the endtubes 26 be 65-45-12, and the endtubes 26 be 100-70-03.

To start, neither quenching treatment nor annealing treatment was performed on this rear axlecase 20. The surface hardnesses taken with a Brinell hardness tester at points a-h shown in FIG. 3 are presented in Table 2.

TABLE 2

| Product ID No. | Results of Hardness Measurement (in $H_B$) | | | | | | | |
|---|---|---|---|---|---|---|---|---|
| | Measuring Position | | | | | | | |
| | a | b | c | d | e | f | g | h |
| None | 285 | 269 | 241 | 241 | 241 | 241 | 255 | 285 |
| 5 | 255 | 255 | 248 | 241 | 241 | 241 | 269 | 262 |
| 8 | 302 | 293 | 262 | 269 | 277 | 255 | 255 | 285 |
| 10 | 302 | 302 | 302 | 269 | 269 | 277 | 302 | 302 |
| 11 | 269 | 269 | 269 | 277 | 277 | 255 | 285 | 285 |
| 12 | 285 | 285 | 255 | 269 | 277 | 255 | 285 | 285 |
| 13 | 269 | 262 | 285 | 285 | 285 | 269 | 293 | 285 |
| 16 | 302 | 302 | 293 | 277 | 269 | 269 | 285 | 302 |
| 17 | 285 | 285 | 269 | 255 | 277 | 269 | 269 | 302 |
| 18 | 293 | 302 | 269 | 277 | 248 | 248 | 285 | 285 |

It will be seen that for each product the hardnesses of the endtubes 26 of the axle housings 22 falls in a hardness range of $H_B=241-311$, which is the specification of ASTM A536-84, 100-70-03. Thus, it was demonstrated that in this case the design specifications were amply satisfied without resorting to quenching treatment.

Figure 4:
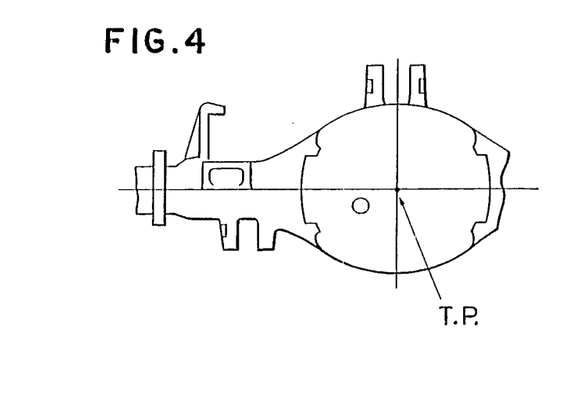
FIG. 4 is a drawing, showing the place that the tension test piece is sampled.

Next, a 4 mm $\phi$ size tension test piece, taken from the portion indicated in FIG. 4 as T.P., gave, in a tension test, a tensile strength of 55 kgf/mm² and an elongation of 23%, attesting to the fact that ample ductility has ben obtained in the part concerned.

Figure 5:
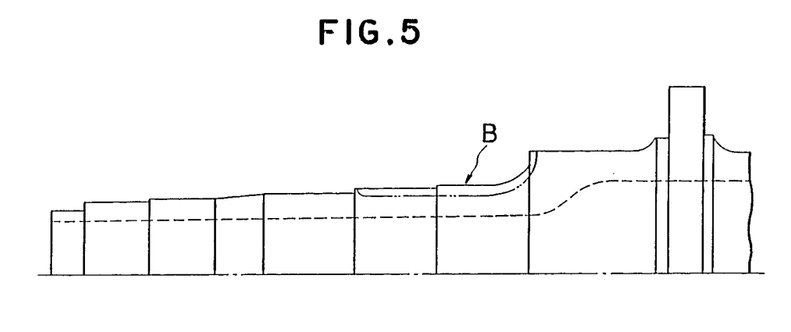
FIG. 5 is a drawing, showing the places on which quenching is performed.

Furthermore, high frequency quenching was performed on the root parts of the endtubes 26 (indicated by B in FIG. 5) of the axle housings 22 for a set of specifications with the as-quenched hardness to be $H_{RC}$ 50 or above and the quenching depth to be 2 mm or more. Quenching was conducted by heating the part B of an endtube 26 for 5.5 seconds at 970–980 degrees C. by fully turning a half-circle induction coil, then cooling with water for 100 seconds. Subsequently, annealing was performed at 200 degrees C., which is below the $A_1$ transformation point.

Figure 6:
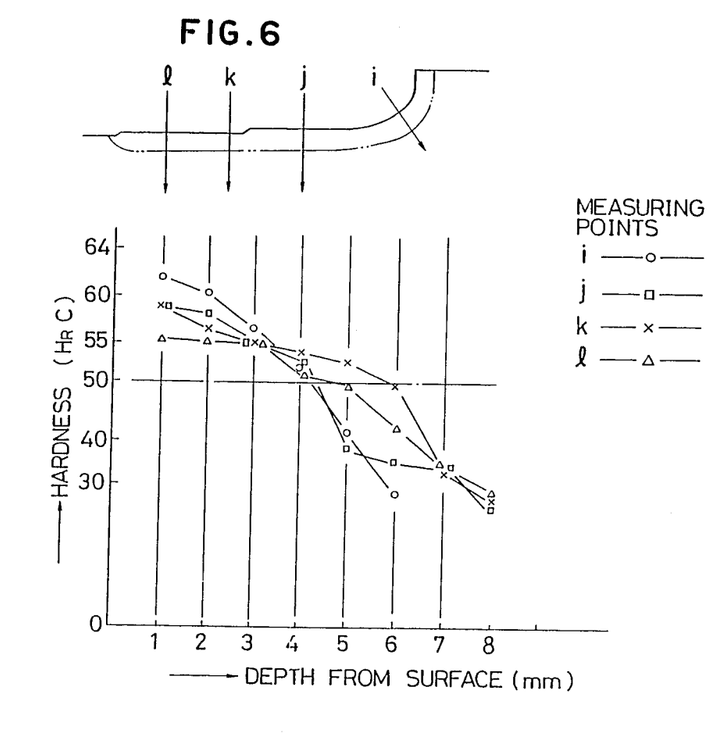
FIG. 6 is a diagram, presenting the results of quenching.

The results are depicted in FIG. 6 in terms of measurements taken with a Rockwell hardness tester (C scale) at points i-l. It will be appreciated that the hardness of $H_{RC}$ 50 or above is kept well beyond a depth of 2 mm, indicating formation of martensitic structure therein.

I claim:

1. A rear axlecase, comprising:
   a differential gear housing, axle housings and endtubes respectively on the outer ends of said axle housings,
   said differential gear housing, said axle housings and said endtubes being integrally defined by single casting of nodular graphite cast iron,
   the portion of said casting defining said differential gear housing and said axle housings being an essentially ductile structure,
   said endtubes each including a portion having increased structural hardness relative to the other portion of said casting.

2. The rear axlecase of claim 1, wherein the portion of said casting which includes said differential gear housing and said axle housings is defined by a ductile pearlite structure.

3. The rear axlecase of claim 2, wherein said endtube portions having increased structural hardness are defined by a tempered, martensitic structure.

4. The rear axlecase of claim 2, wherein the portion of said casting which includes said differential gear housing and said axle housings and is defined by a ductile pearlite structure has as surface hardness, taken on a Brinell hardness scale, of generally 150.

5. The rear axlecase of claim 4, wherein the portion of said endtubes having increased structural hardness has a surface hardness, taken on a Brinell hardness scale, of essentially between 241 and 311.

6. The rear axlecase of claim 1, wherein the portion of said endtubes having increased structural hardness has a surface hardness, taken on a Brinell hardness scale, of essentially between 241 and 311.

* * * * *